United States Patent
Zhao

(10) Patent No.: US 11,991,709 B2
(45) Date of Patent: May 21, 2024

(54) INFORMATION SCHEDULING METHODS AND APPARATUSES, TRANSCEIVING METHODS AND APPARATUSES, BASE STATIONS AND USER EQUIPMENT

(71) Applicant: BEIJING XIAOMI MOBILE SOFTWARE CO., LTD., Beijing (CN)

(72) Inventor: Qun Zhao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 521 days.

(21) Appl. No.: 17/266,523

(22) PCT Filed: Aug. 6, 2018

(86) PCT No.: PCT/CN2018/099013
§ 371 (c)(1),
(2) Date: Feb. 5, 2021

(87) PCT Pub. No.: WO2020/029027
PCT Pub. Date: Feb. 13, 2020

(65) Prior Publication Data
US 2022/0279489 A1 Sep. 1, 2022

(51) Int. Cl.
*H04W 72/23* (2023.01)
*H04L 5/00* (2006.01)

(52) U.S. Cl.
CPC ........... *H04W 72/23* (2023.01); *H04L 5/0055* (2013.01)

(58) Field of Classification Search
CPC ..... H04W 72/23; H04W 72/04; H04W 72/12; H04W 72/1268; H04W 76/27; H04L 5/0055; H04L 1/1854; H04L 1/1858; H04L 1/1887; H04L 1/1896; H04L 5/0044; H04L 5/0053; H04L 1/18
USPC ........................................................ 370/329
See application file for complete search history.

(56) References Cited

U.S. PATENT DOCUMENTS

| | | | |
|---|---|---|---|
| 2017/0215202 A1* | 7/2017 | Yang | H04W 72/20 |
| 2019/0363840 A1* | 11/2019 | Wang | H04L 1/1854 |
| 2020/0052811 A1* | 2/2020 | Li | H04L 1/1887 |

FOREIGN PATENT DOCUMENTS

| | | |
|---|---|---|
| CN | 106455103 A | 2/2017 |
| CN | 107666710 A | 2/2018 |
| CN | 107707338 A | 2/2018 |
| CN | 108259139 A | 7/2018 |

(Continued)

OTHER PUBLICATIONS

LG Electronics, Consideration on HARQ-ACK feedback timing for NR, Aug. 20, 2017, LG (Year: 2017).*

(Continued)

*Primary Examiner* — Kwang B Yao
*Assistant Examiner* — Syed M Bokhari
(74) *Attorney, Agent, or Firm* — Arch & Lake LLP

(57) ABSTRACT

The present disclosure provides an information scheduling method and apparatus, an information transceiving method and apparatus, a base station, user equipment, and computer-readable storage mediums. The information scheduling method includes: configuring time unit information for user equipment (UE), where the time unit information indicates one or more time units; scheduling at least one of user data or uplink feedback of downlink data according to the configured time unit information.

20 Claims, 7 Drawing Sheets

(56) References Cited

FOREIGN PATENT DOCUMENTS

| WO | 2017129127 A1 | 8/2017 |
|---|---|---|
| WO | 2017151632 A1 | 9/2017 |
| WO | 2017155738 A1 | 9/2017 |

OTHER PUBLICATIONS

State Intellectual Property Office of the People's Republic of China, Office Action and Search Report Issued in Application No. 201880001644.9, dated Mar. 18, 2021, (17p). (Submitted with Machine Translation).
European Patent Office, Extended European Search Report Issued in Application No. 18929262.6, dated Aug. 2, 2021, (8p).
ISA State Intellectual Property Office of the People's Republic of China, Written Opinion of the International Searching Authority Issued in Application No. PCT/CN2018/099013, dated Apr. 10, 2019, (9p).
LG Electronics, "Consideration on HARO-ACK feedback timing for NR", 3GPP TSG RAN WG1 Meeting #90 Prague, Czechia, R1-1713193, Aug. 21-25, 2017, (5p).
Sharp, "DL HARQ and UL scheduling timing in NR", 3GPP TSG RAN WG1 NR Ad Hoc Meeting Spokane, USA, R1-1700728, Jan. 16-20, 2017, (3p).
State Intellectual Property Office of the People's Republic of China, Office Action and Search Report Issued in Application No. 201880001644.9, dated Dec. 31, 2020, (36p). (Submitted with Machine Translation).
Intellectual property India, Office Action Issued in Application No. 202147008555, dated Jan. 20, 2022, (9 pages). (Submitted with Partial Machine Translation).
International Search Report of PCT Application No. PCT/CN2018/099013 dated Apr. 10, 2019 with English translation (4p).
Fujitsu, "Discussion on time domain resource allocation", 3GPP TSG RAN WG1 NR Ad-Hoc#2, Qingdao, P.R. China, R1-1710238, Jun. 27-30, 2017, (3p).
Nokia, Nokia Shanghai Bell, "Remaining aspects of HARQ management", 3GPP TSG RAN WG1 Meeting 90bis, Prague, Czech, R1-1718621 , Oct. 9-13, 2017, (9p).
3rd Generation Partnership Project;Technical Specification Group Radio Access Network; NR; Physical layer procedures for control (Release 16) ; 3GPP TS 38.213 V16.4.0 (Dec. 2020), (181p).
European Patent Office Action issued in Application No. 18929262.6, dated Dec. 14, 2022,(5p).
European Patent Office, Office Action Issued in Application No. 18929262.6, dated May 3, 2022, Germany, 7 pages.
State Intellectual Property Office of the People's Republic of China, Office Action and Search Report Issued in Application No. 201880001644.9, dated Mar. 18, 2021, (Submitted with Machine Translation), (17p).
Extended European Search Report Issued in EP Application No. 18929262.6, dated Aug. 2, 2021, (8p).
Intellectual property India, Hearing Notice in Reference of Application No. 202147008555, Jan. 22, 2024, (2P).
State Intellectual Property Office of the People's Republic of China, Office Action and Search Report Issued in Application No. 202110942512.X, Mar. 27, 2024, (17P).

* cited by examiner

Mode corresponding to the time units
= {4, 3, 4,3}sysmbol

Offset = 0

INFORMATION SCHEDULING METHODS AND APPARATUSES, TRANSCEIVING METHODS AND APPARATUSES, BASE STATIONS AND USER EQUIPMENT

CROSS-REFERENCE TO RELATED APPLICATION

This application is the national phase application of International Application No. PCT/CN2018/099013 filed on Aug. 6, 2018, the entire content of which is hereby incorporated by reference in its entirety for all purposes.

TECHNICAL FIELD

The present disclosure relates to the technical field of communications, and in particular, to an information scheduling method and apparatus, an information transceiving method and apparatus, a base station, user equipment, and a computer readable storage medium.

BACKGROUND

A new generation of Internet application has continuously rendered higher requirements on wireless communication technology, and the wireless communication technology is driven to continuously evolve to meet application requirements. At present, cellular mobile communication technology is in an evolution stage of a new generation technology. In a new generation of mobile communication systems, how to better design uplink transmissions to meet the requirements of the systems is an important problem.

New Radio (NR for short) is required to support flexible configuration of a plurality of service types. Different service types have different requirements for wireless communication technologies. For example, the major requirements of an enhanced mobile broadband (eMBB for short) service type are in terms of large bandwidth, high rate, etc., the major requirements of a Ultra Reliable Low Latency Communication (URLLC for short) service type are in terms of higher reliability and lower time delay, and the major requirements of a massive machine type communication (mMTC for short) service type are in terms of a large number of connections. In order to support a plurality of services simultaneously, a plurality of logical channels (LCHs for short) are defined in a Media Access Control (MAC for short) layer in order to correspond to data having different Quality of Service (QoS) requirements.

Similar to Long Term Evolution (LTE for short), a hybrid automatic repeat request (HARQ for short) mechanism is also used in the NR to ensure the reliability of data transmission on a physical layer. User equipment feeds back information about whether downlink data sent by a base station has been received without errors to the base station through an uplink control channel, and the base station performs operations such as retransmission according to the information returned by the user equipment. The user equipment may combine uplink HARQ feedback of multiple downlink data transmissions together to form a HARQ codebook to be fed back to the base station over one uplink control channel transmission. The relevant standards specifically define the uplink HARQ feedback of which downlink data is contained in the HARQ codebook fed back through a physical uplink control channel (PUCCH), and a bit arrangement order of the uplink HARQ feedback, etc., so as to ensure that the base station can correctly understand the received uplink HARQ feedback information.

The NR system is divided into time units with a period of a time slot in the time domain, and the length of each slot is fixed to 14 Orthogonal Frequency Division Multiplexing (OFDM) symbol lengths. In the NR, the generation and feedback of the HARQ codebook are both based on slot. In downlink control information (DCI) for scheduling downlink data transmission, it can be indicated that the HARQ feedback corresponding to downlink data is transmitted in which slot, and all HARQ feedback transmitted in the same slot are combined and transmitted through the PUCCH.

The NR system needs to support co-existence of a plurality of different services. However, the time unit requirements for HARQ feedback are also different dependent on the delay and reliability requirements of different services. For example, for a URLLC service, the downlink data transmission time of the URLC service is usually much shorter than the length of the slot (for example, 1 or 2 symbols), and the interval time from the end of downlink data transmission to the HARQ feedback, and the length of the PUCCH time for transmitting the HARQ feedback are often smaller than the length of the slot. At this time, still using slot as the time unit of the HARQ feedback wastes the bit overhead of control signaling. However, for some services that are insensitive to delay, such as mMTC services, in order to satisfy a coverage requirement and reduce signaling overhead, downlink data may be transmitted by using techniques such as repeated transmission or aggregation of a plurality of slots. However, in this case, still using a separate slot as the time unit of the HARQ feedback wastes the bit overhead of the control signaling.

SUMMARY

In view of this, this application discloses communication methods and apparatuses, power transmitting devices, power receiving devices and computer-readable storage mediums, so as to achieve communication between a PTX and a PRX without affecting the charging efficiency in a one PTX-to-multiple PRXs scenario.

According to a first aspect of the present disclosure, an information scheduling method is provided, and the method includes: configuring time unit information for user equipment (UE) by a base station, wherein the time unit information indicates one or more time units; and scheduling, by the base station, at least one of user data or uplink feedback of downlink data according to the configured time unit information.

According to a second aspect of the present disclosure, an information transceiving method is provided, and the method includes: receiving time unit information configured by a base station for User Equipment, wherein the time unit information indicates one or more time units; and performing at least one of data transmission, data reception, or uplink feedback transmission of downlink data according to the time unit information.

According to a third aspect of the present disclosure, a user equipment is provided, and the user equipment includes: a processor; and a storage storing instructions executable by the processor, wherein the processor is configured to: receive time unit information configured by a base station for the UE, wherein the time unit information indicates one or more time units; and perform at least one of data transmission, data reception, or uplink feedback transmission of downlink data according to the time unit information.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION

Figure 1:
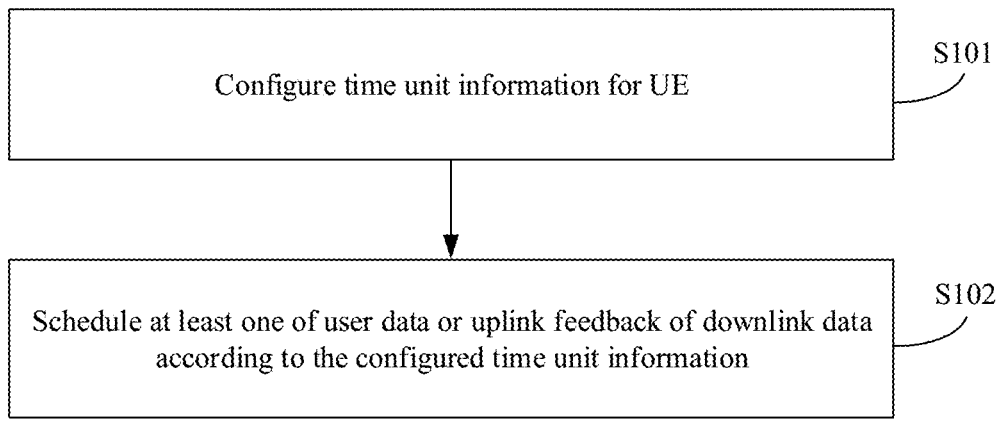
FIG. 1 is a flowchart illustrating an information scheduling method according to an example of the present disclosure.

Examples will be described in detail herein, with the illustrations thereof represented in the drawings. When the following descriptions involve the drawings, like numerals in different drawings refer to like or similar elements unless otherwise indicated. The following examples described do not represent all examples consistent with the present disclosure. Rather, they are merely examples of apparatuses and methods consistent with some aspects of the present disclosure as detailed in the appended claims.

FIG. 1 is a flowchart illustrating an information scheduling method according to an example of the present disclosure. In an example, the method is described in the perspective of a base station, and includes the steps as shown in FIG. 1.

At step S101, time unit information may be configured for UE, where the time unit information indicates one or more time units.

The time unit information may further include at least one of mode information and an offset corresponding to the time unit.

In this example, the time unit information may be sent to the UE through radio resource control (RRC) signaling, or through DCI, or through RRC signaling and DCI.

For example, the base station may directly send the time unit to the UE through RRC signaling, and the time unit may be one of a set of [2 symbols, 7 symbols, 1 slot, 2 slot, 4 slot, 8 slot]. The base station may send a time unit set such as [2 symbols, 7 symbols, 1 slot, 2 slot, 4 slot, 8 slot], to the UE through RRC signaling and then indicate which one of the time unit set to be the time unit corresponding to the UE through DCI. For another example, the base station may agree on a time unit set with the UE in advance, and then indicate which one of the time unit set to be the time unit corresponding to the UE through DCI.

Figure 2:
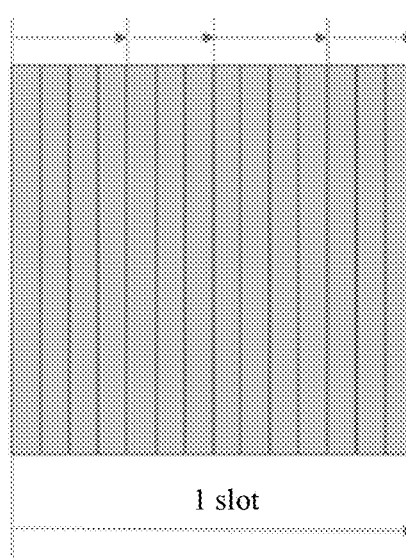
FIG. 2 is a schematic diagram illustrating time unit according to an example of the present disclosure.

Meanwhile, the base station may also configure an offset corresponding to the time unit, where the configured offset may indicate an offset between the edge of the time unit and the edge of a first slot in a frame with a system frame number (SFN) "0". When the offset is 0, the two edges are aligned. Still further, the base station may configure a plurality of time units of unequal time lengths by configuring a mode corresponding to the time units. For example, as shown in FIG. 2, the length of the time unit within one slot may be configured as [4 symbols, 3 symbols, 4 symbols, 3 symbols], that is, the mode corresponding to the time unit is [4, 3, 4, 3] symbol, and the offset is 0.

In this example, when a plurality of time units are configured by a base station for UE, one of the time units may be transmitted through DCI, so as to serve as a time unit used for at least one of current user data transmission and uplink feedback of downlink data. The base station may also send indication information to the UE through DCI, where the indication information is used to indicate the time unit currently for the UE. For example, if the base station configures two different time units for the UE to be 2 symbols and 1 slot, 1 bit in the DCI may be used to indicate the configured time unit, where 0 indicates that the configured time unit is 1 slot, 1 indicates that the configured time unit is 2 symbols. A physical layer parameter used for user data transmission may also be sent to the UE through the DCI for scheduling the user data transmission. The physical layer parameter may include, but is not limited to, a time-frequency resource location and an aggregation level, and the physical layer parameter may be used to implicitly indicate a time unit used by at least one of the current user data transmission and uplink feedback of downlink data. The value of a preset information domain may also be sent to the UE through the DCI, and the value of the preset information domain or the format of the DCI may be used to implicitly indicate the time unit currently for the UE.

At step S102, at least one of user data or uplink feedback of downlink data may be scheduled according to the configured time unit information.

The user data may include at least one of uplink data and downlink data. That is, the base station may schedule at least one of the uplink data and the downlink data according to the configured time unit information. At this time, a first number may be indicated in the DCI for scheduling user data transmission, where the first number represents the number of time units between the time unit at which the user data transmission starts and the time unit at which the DCI transmission is located. For example, the time unit at which the user data transmission starts is the first time unit, and the time unit at which the DCI transmission is located is the fourth time unit, and the first number of time units between the two time units is three.

Scheduling the uplink feedback according to the configured time unit information may include but be not limited to one or more of the following.

11) When the UE does not repeat transmission of the uplink feedback, the transmission start time and end time of the uplink feedback are both within a same time unit.

12) When the UE repeats transmission of the uplink feedback, the transmission start time and end time of each repeated transmission are both within a same time unit, and the transmission start times and end times of different repeated transmissions are within different time units.

13) When the UE repeats transmission of the uplink feedback, the interval period between repeated transmissions is an integer multiple of the time unit.

14) A second number is indicated in the DCI for scheduling downlink data transmission, where the second number represents the number of time units between the time unit at which the downlink data transmission is ended and the time unit at which the corresponding uplink feedback transmission is located.

15) When a plurality of uplink feedback transmissions corresponding to a plurality of downlink data transmissions are within the same time unit, a plurality of uplink feedback corresponding to the uplink feedback transmissions may be combined together for transmission.

In the above example, by configuring the time unit information for the UE, flexible configurable time unit may be supported in the NR system, and at least one of user data and uplink feedback of downlink data may be scheduled according to the configured time unit information, so as to save the bit overhead of control signaling.

Figure 3:
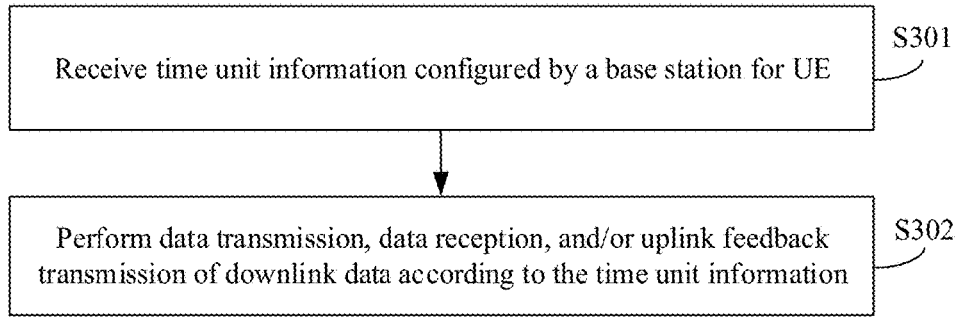
FIG. 3 is a flowchart illustrating an information transceiving method according to an example of the present disclosure.

FIG. 3 is a flowchart illustrating an information transceiving method according to an example of the present disclosure. In an example, the method is described in the perspective of UE, and includes the steps as shown in FIG. 3.

At step S301, time unit information configured by a base station for UE may be received, where the time unit information indicates one or more time units.

In this example, the UE may receive the time unit information sent by the base station through RRC signaling, or through DCI, or through RRC signaling and DCI.

The time unit information may further include at least one of mode information and an offset corresponding to the time unit.

For example, the UE may receive the time unit information configured by the base station for the UE through at least one of the following.

Method 21) the UE receives the DCI sent by the base station, acquires the time unit from the DCI, and uses the acquired time unit as the time unit used by at least one of the current user data transmission and uplink feedback.

Method 22) the UE receives the DCI sent by the base station, acquires indication information from the DCI, and acquires the time unit currently for the UE according to the indication information.

Method 23) the UE receives the DCI for scheduling user data transmission from the base station, obtains a physical layer parameter used for user data transmission from the DCI, and obtains a time unit used for at least one of current user data transmission or uplink feedback according to the physical layer parameter.

For example, the base station may configure a mapping relationship between different time units and a control resource set (CORESET for short) in advance by RRC signaling. Then the user equipment may learn, from the DCI for scheduling downlink data transmission, which CORESET the time-frequency resource used for user data transmission belongs to, so as to determine the time unit used for the uplink feedback corresponding to the downlink data. In addition, when an aggregation level used for user data transmission which is acquired from the DCI for scheduling downlink data transmission is relatively high, for example, the aggregation level is 8 or 16, it generally means that the delay and reliability requirements of transmission are high, and therefore, the user equipment may select a shorter time unit.

Method 24) the UE receives the DCI sent by the base station, acquires the value of the preset information domain from the DCI, and acquires the time unit currently for the UE according to the value of the preset information domain or the format of the DCI.

For example, the base station may configure a mapping relationship between different time units and different data service types in advance through RRC signaling. There may be different DCI formats corresponding to data of different service types. For example, a separate DCI format may be defined for the URLLC service. Therefore, based on the different formats of the DCI for scheduling downlink data transmission, the user equipment may determine different service types of the downlink data, and further determine the time unit to be used. In an example, different values of certain information domains in the DCI may also implicitly indicate different service types of the downlink data, according to which the user equipment may determine the time unit to be used.

At step S302, data transmission, data reception, and/or uplink feedback transmission of downlink data may be performed according to the time unit information.

Performing the data transmission and data reception according to the time unit information may include: obtaining a first number of the time units between the time unit at which the user data transmission starts and the time unit at which the DCI transmission locates from the DCI for scheduling the user data transmission; determining the time unit at which the user data transmission starts according to the first number; and performing at least one of the data transmission and the data reception according to the time unit at which the user data transmission starts.

Performing the uplink feedback transmission of downlink data according to the time unit information may include but be not restrictive to one or more of the following.

31) when transmission of the uplink feedback is not repeated, the uplink feedback is performed in a time unit.

32) when transmission of the uplink feedback is repeated, each repeated transmission is performed in a corresponding time unit, different repeated transmissions are performed in different time units, and the interval period between repeated transmissions is an integer multiple of the time unit.

33) obtaining a second number of the time units between the time unit at which the downlink data transmission ends and the time unit at which the corresponding uplink feedback transmission locates from the DCI for scheduling the downlink data transmission; determining the time unit at which the corresponding uplink feedback transmission locates according to the second number; and performing the uplink feedback according to the time unit at which the corresponding uplink feedback transmission locates.

34) When a plurality of uplink feedback transmissions corresponding to a plurality of downlink data transmissions are within the same time unit, a plurality of uplink feedback corresponding to the uplink feedback transmissions may be combined together for transmission.

In addition, if a plurality of uplink feedback transmissions corresponding to different time units need to be performed at the same moment, uplink feedback corresponding to one of the time units may be selected to be transmitted, and uplink feedback corresponding to the remaining time units may be abandoned. In an example, uplink feedback corresponding to multiple different time units may be multiplexed and then transmitted.

For example, the base station may configure a plurality of uplink feedback transmission priorities for different time units through RRC signaling, and the UE may select a time unit with a higher priority, or select a time unit with a shorter length according to the lengths of the time units corresponding to the plurality of uplink feedback, and then transmit the uplink feedback corresponding to the selected time unit. For another example, the base station may select one of the time units, and multiplex uplink feedbacks corresponding to different time units within the selected time unit for transmission.

In the above example, by receiving time unit information configured by the base station for the UE, and performing at least one of data transmission, data reception and uplink feedback transmission of downlink data according to the time unit information, the delay and reliability requirements of different services can be better satisfied.

Figure 4:
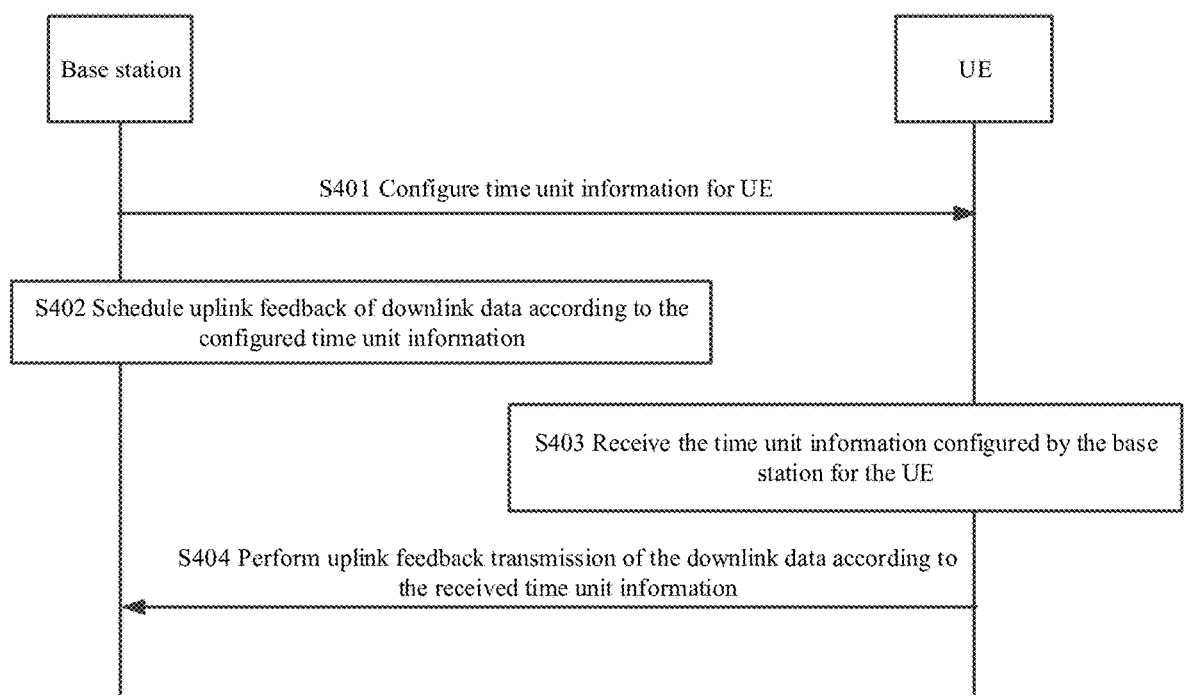
FIG. 4 is a signaling flowchart illustrating an information transceiving method according to an example of the present disclosure.

FIG. 4 is a signaling flowchart illustrating an information transceiving method according to an example of the present disclosure. In an example, the method is described in the perspective of interaction between a base station and UE, and the method may include the steps as shown in FIG. 4.

At step S401, the base station may configure time unit information for UE, where the time unit information indicates one or more time units.

At step S402, the base station may schedule uplink feedback of downlink data according to the configured time unit information.

At step S403, the UE may receive the time unit information configured by the base station for the UE.

The execution order of the steps S402 and S403 is not limited.

At step S404, the UE may perform uplink feedback transmission of the downlink data according to the received time unit information.

In the above example, by interaction between the base station and the UE, flexible configurable time unit may be supported in the NR system, so as to save the bit overhead of control signaling, and satisfy the delay and reliability requirements of different services better.

Figure 5:
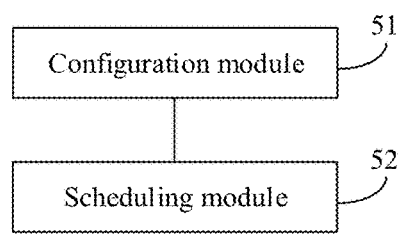
FIG. 5 is a block diagram illustrating an information scheduling apparatus according to an example of the present disclosure.

FIG. 5 is a block diagram illustrating an information scheduling apparatus according to an example of the present disclosure. The apparatus may be located in a base station, and as shown in FIG. 5, the apparatus may include a configuration module 51 and a scheduling module 52.

The configuration module 51 may be configured to configure time unit information for user equipment (UE), where the time unit information indicates one or more time units.

The configuration module 51 may be configured to transmit the time unit information to the UE through radio resource control (RRC) signaling and/or downlink control information (DCI).

The time unit information may further include at least one of mode information and an offset corresponding to the time unit.

In this example, the time unit information may be sent to the UE through radio resource control (RRC) signaling, or through DCI, or through RRC signaling and DCI.

For example, the base station may directly send the time unit to the UE through RRC signaling, and the time unit may be one of a set of [2 symbols, 7 symbols, 1 slot, 2 slot, 4 slot, 8 slot]. The base station may send a time unit set such as [2 symbols, 7 symbols, 1 slot, 2 slot, 4 slot, 8 slot], to the UE through RRC signaling and then indicate which one of the time unit set to be the time unit corresponding to the UE through DCI. For another example, the base station may agree on a time unit set with the UE in advance, and then indicate which one of the time unit set to be the time unit corresponding to the UE through DCI.

Meanwhile, the base station may also configure an offset corresponding to the time unit, where the configured offset may indicate an offset between the edge of the time unit and the edge of a first slot in a frame with a system frame number (SFN) "0". When the offset is 0, the two edges are aligned. Still further, the base station may configure a plurality of time units of unequal time lengths by configuring a mode corresponding to the time units. For example, as shown in FIG. 2, the length of the time unit within one slot may be configured as [4 symbols, 3 symbols, 4 symbols, 3 symbols], that is, the mode corresponding to the time unit is [4, 3, 4, 3] symbol, and the offset is 0.

The scheduling module 52 may be configured to schedule at least one of user data or uplink feedback of downlink data according to the time unit information configured by the configuration module 51.

The scheduling module 52 may be configured to indicate, in DCI for scheduling user data transmission, a first number of time units between the time unit at which the user data transmission starts and the time unit at which the DCI transmission is located.

The user data may include at least one of uplink data and downlink data. That is, the base station may schedule at least one of the uplink data and the downlink data according to the configured time unit information. At this time, a first number may be indicated in the DCI for scheduling user data transmission, where the first number represents the number of time units between the time unit at which the user data transmission starts and the time unit at which the DCI transmission is located. For example, the time unit at which the user data transmission starts is the first time unit, and the time unit at which the DCI transmission is located is the fourth time unit, and the first number of time units between the two time units is three.

In the above examples, by configuring time unit information for the UE, flexible configurable time unit may be supported in the NR system, and at least one of user data and uplink feedback of downlink data may be scheduled according to the configured time unit information, so as to save the bit overhead of control signaling.

Figure 6:
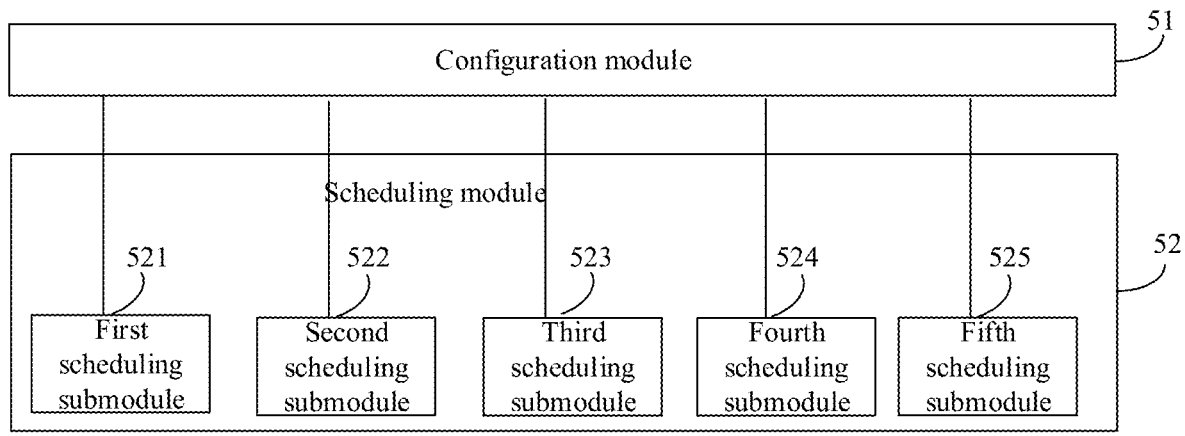
FIG. 6 is a block diagram illustrating another information scheduling apparatus according to an example of the present disclosure.

FIG. 6 is a block diagram illustrating another information scheduling apparatus according to an example of the present disclosure. As shown in FIG. 6, based on the example shown in FIG. 5, the scheduling module 52 may include at least one of the following submodules.

A first scheduling submodule 521 may be configured to, when the UE does not repeat transmission of the uplink feedback, set both a transmission start time and transmission end time of the uplink feedback to be within the same time unit.

A second scheduling submodule 522 may be configured to, when the UE repeats the transmission of the uplink feedback, set both the transmission start time and transmission end time of each repeated transmission to be within the same time unit, and set the transmission start times and transmission end times of different repeated transmissions to be within different time units respectively.

A third scheduling submodule 523 may be configured to, when the UE repeats the transmission of the uplink feedback, set an interval period between repeated transmissions to be an integer multiple of the time unit.

A fourth scheduling submodule 524 may be configured to indicate, in DCI for scheduling downlink data transmission, a second number of time units between the time unit at which the downlink data transmission is ended and the time unit at which a corresponding uplink feedback transmission is located.

A fifth scheduling submodule 525 may be configured to, when multiple uplink feedback transmissions corresponding to multiple downlink data transmissions are within the same time unit, combine multiple uplink feedbacks together for transmission.

In the above examples, by scheduling the uplink feedback according to the configured time unit information, the bit overhead of the control signaling can be saved.

Figure 7:
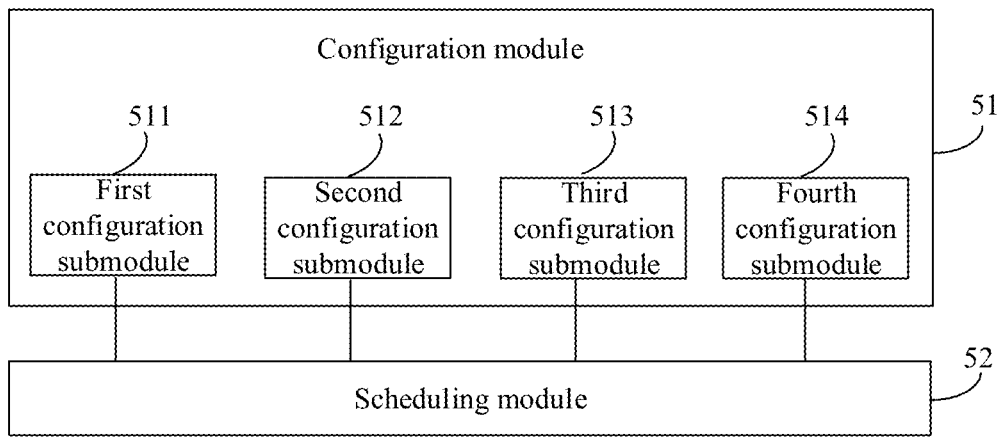
FIG. 7 is a block diagram illustrating another information scheduling apparatus according to an example of the present disclosure.

FIG. 7 is a block diagram illustrating another information scheduling apparatus according to an example of the present disclosure. As shown in FIG. 7, based on the example shown in FIG. 5, the configuration module 51 may include at least one of the following submodules.

A first configuration submodule 511 may be configured to, when a plurality of time units are configured for the UE, transmitting, through DCI, one of the plurality of time units as a time unit used for at least one of current user data transmission or uplink feedback of the downlink data; or A second configuration submodule 512 may be configured to transmit indication information to the UE through DCI, wherein the indication information is configured to indicate a time unit currently for the UE.

A third configuration submodule 513 may be configured to transmit a physical layer parameter used for the user data transmission to the UE through the DCI for scheduling the user data transmission, wherein the physical layer parameter is configured to implicitly indicate the time unit used for at least one of the current user data transmission or uplink feedback of the downlink data.

A fourth configuration submodule 514 may be configured to transmit a value of a preset information domain to the UE through the DCI, wherein the value of the preset information domain or a format of the DCI is configured to implicitly indicate the time unit currently for the UE.

In the above examples, time unit information may be configured for UE in various manners, and the implementation means are flexibly varied.

Figure 8:
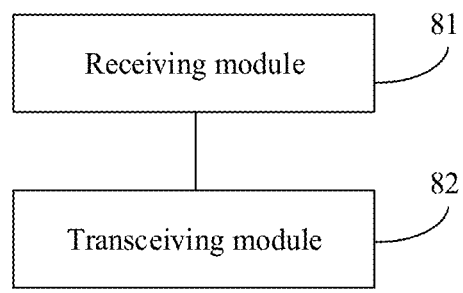
FIG. 8 is a block diagram illustrating an information transceiving apparatus according to an example of the present disclosure.

FIG. 8 is a block diagram illustrating an information transceiving apparatus according to an example of the present disclosure. The apparatus may be located within UE, and as shown in FIG. 8, the apparatus may include the following modules.

A receiving module 81 may be configured to receive time unit information configured by a base station for the UE, wherein the time unit information indicates one or more time units.

The receiving module 81 may be configured to receive the time unit information transmitted by the base station through at least one of radio resource control (RRC) signaling or downlink control information (DCI).

In this example, the UE may receive the time unit information sent by the base station through RRC signaling, or through DCI, or through RRC signaling and DCI.

The time unit information may further include at least one of mode information and an offset corresponding to the time unit.

A transceiving module 82 may be configured to perform at least one of data transmission, data reception, or uplink feedback transmission of downlink data according to the time unit information received by the receiving module 81.

In the above examples, by receiving time unit information configured by the base station for the UE, and performing at least one of data transmission, data reception and uplink feedback transmission of downlink data according to the time unit information, the delay and reliability requirements of different services can be better satisfied.

Figure 9:
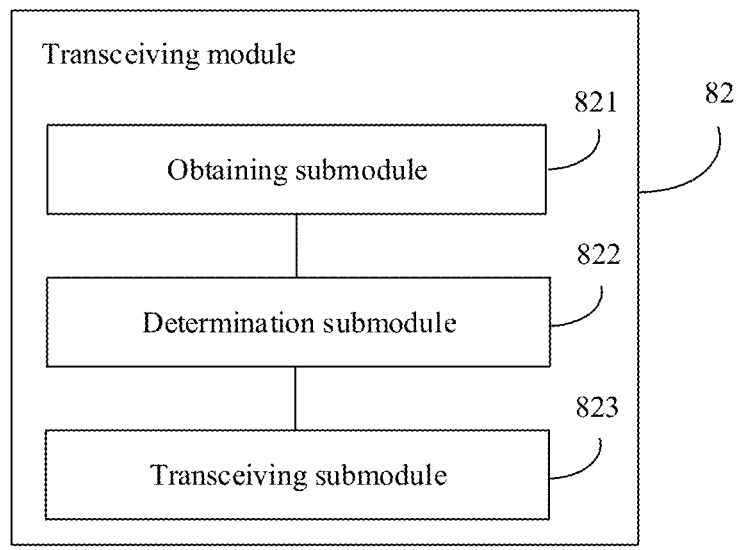
FIG. 9 is a block diagram illustrating another information transceiving apparatus according to an example of the present disclosure.

FIG. 9 is a block diagram illustrating another information transceiving apparatus according to an example of the present disclosure. As shown in FIG. 9, based on the example in FIG. 8, the transceiving module 82 may include the following submodules.

An obtaining submodule 821 may be configured to obtain, from downlink control information (DCI) for scheduling user data transmission, a first number of time units between the time unit at which the user data transmission starts and the time unit at which DCI transmission is located.

A determination submodule 822 may be configured to determine the time unit at which the user data transmission starts according to the first number obtained by the obtaining submodule 821.

A transceiving submodule 823 may be configured to perform at least one of the data transmission or data reception according to the time unit at which the user data transmission starts determined by the determination submodule 822.

In the above examples, a first number of time units between the time unit at which the user data transmission starts and the time unit at which the DCI transmission is located may be obtained from the DCI for scheduling the user data transmission, the time unit at which the user data transmission starts may be determined according to the first number, and at least one of data transmission and data reception may be performed according to the time unit at which the user data transmission starts, so as to better satisfy the delay and reliability requirements of different services.

Figure 10:
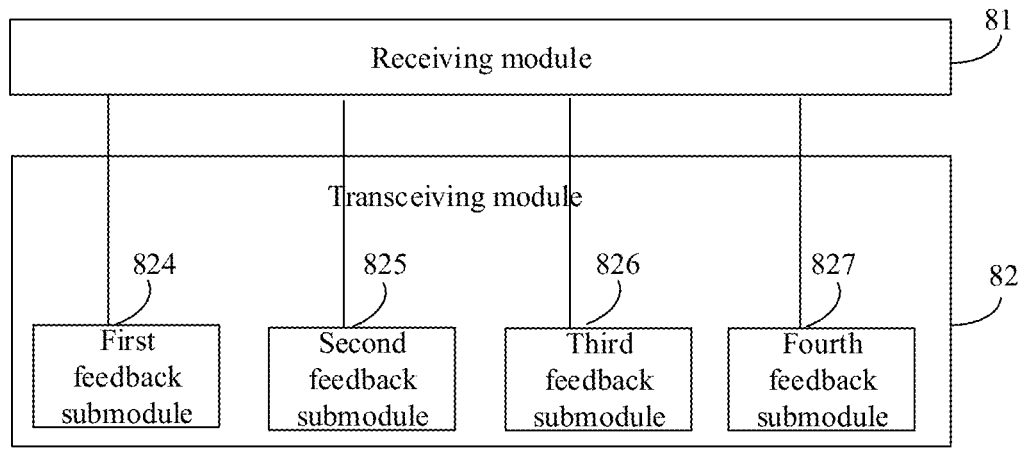
FIG. 10 is a block diagram illustrating another information transceiving apparatus according to an example of the present disclosure.

FIG. 10 is a block diagram illustrating another information transceiving apparatus according to an example of the present disclosure. As shown in FIG. 10, based on the example in FIG. 8, the transceiving module 82 may include at least one of the following submodules.

A first feedback submodule 824 may be configured to, when transmission of the uplink feedback is not repeated, perform the uplink feedback within one time unit.

A second feedback submodule 825 may be configured to, when transmission of the uplink feedback is repeated, perform every repeated transmission within one time unit, and perform different repeated transmissions within different time units, wherein an interval period between repeated transmissions is an integer multiple of the time unit.

A third feedback submodule 826 may be configured to obtain, from DCI for scheduling downlink data transmission, a second number of time units between the time unit at which the downlink data transmission is ended and the time unit at which a corresponding uplink feedback transmission is located, determine the time unit at which the corresponding uplink feedback transmission is located according to the second number, and perform the uplink feedback according to the time unit at which the corresponding uplink feedback transmission is located.

A fourth feedback submodule 827 may be configured to, when multiple uplink feedback transmissions corresponding to multiple downlink data transmissions are within a same time unit, combine multiple uplink feedbacks together for transmission.

In the above examples, uplink feedback transmission of downlink data may be performed according to the time unit information, so as to perform flexible uplink feedback according to different service types.

Figure 11:
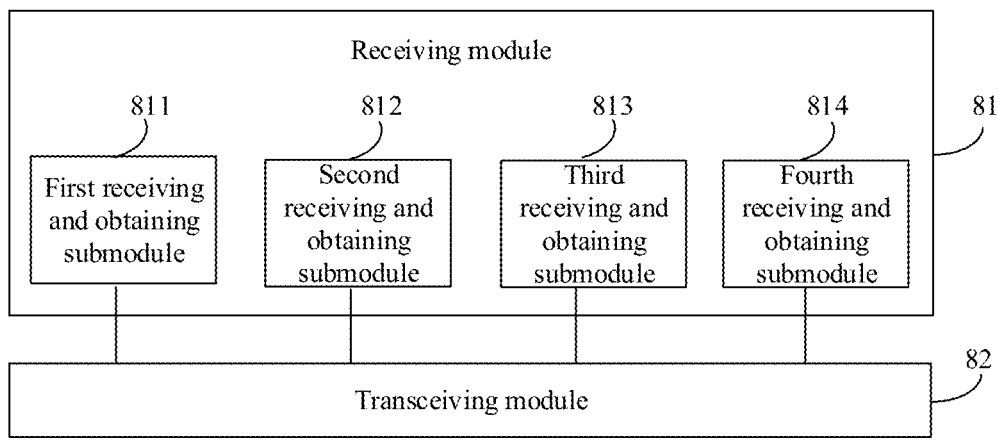
FIG. 11 is a block diagram illustrating another information transceiving apparatus according to an example of the present disclosure.

FIG. 11 is a block diagram illustrating another information transceiving apparatus according to an example of the present disclosure. As shown in FIG. 11, based on the example in FIG. 8, the receiving module 81 may include at least one of the following submodules.

A first receiving and obtaining submodule 811 may be configured to receive downlink control information (DCI) transmitted by the base station, obtain a time unit from the DCI, and use the obtained time unit as a time unit used for at least one of current user data transmission or uplink feedback.

A second receiving and obtaining submodule 812 may be configured to receive the DCI transmitted by the base station, obtain indication information from the DCI, and obtain a time unit currently for the UE according to the indication information.

A third receiving and obtaining submodule 813 may be configured to, receive from the base station the DCI for scheduling user data transmission, obtain a physical layer parameter used for the user data transmission from the DCI, and obtain the time unit used for at least one of the current user data transmission or uplink feedback according to the physical layer parameter.

For example, the base station may configure a mapping relationship between different time units and a control resource set (CORESET for short) in advance by RRC signaling. Then the user equipment may learn, from the DCI for scheduling downlink data transmission, which CORESET the time-frequency resource used for user data transmission belongs to, so as to determine the time unit used for the uplink feedback corresponding to the downlink data. In addition, when an aggregation level used for user data transmission which is acquired from the DCI for scheduling downlink data transmission is relatively high, for example, the aggregation level is 8 or 16, it generally means that the delay and reliability requirements of transmission are high, and therefore, the user equipment may select a shorter time unit.

A fourth receiving and obtaining submodule 814 may be configured to, receive the DCI transmitted by the base station, obtain a value of a preset information domain from the DCI, and obtain the time unit currently for the UE according to the value of the preset information domain or a format of the DCI.

For example, the base station may configure a mapping relationship between different time units and different data service types in advance through RRC signaling. There may be different DCI formats corresponding to data of different service types. For example, a separate DCI format may be defined for the URLLC service. Therefore, based on the different formats of the DCI for scheduling downlink data transmission, the user equipment may determine different service types of the downlink data, and further determine the time unit to be used. In an example, different values of certain information domains in the DCI may also implicitly indicate different service types of the downlink data, according to which the user equipment may determine the time unit to be used.

In the above examples, time unit information configured by the base station for the UE may be received through various ways, and the implementation means are flexibly varied.

Figure 12:
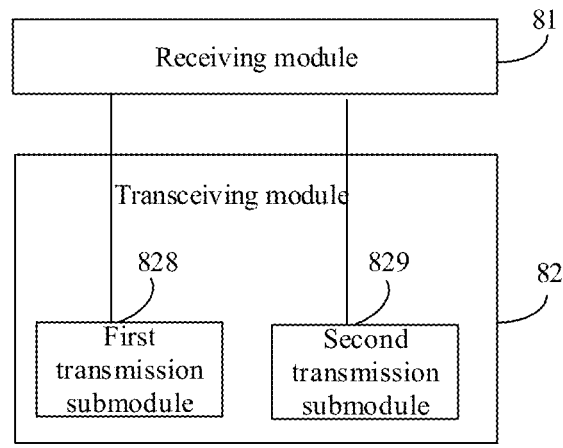
FIG. 12 is a block diagram illustrating another information transceiving apparatus according to an example of the present disclosure.

FIG. 12 is a block diagram illustrating another information transceiving apparatus according to an example of the present disclosure. As shown in FIG. 12, based on the example in FIG. 8, the transceiving module 82 may include a first transmission submodule 828 or a second transmission submodule 829.

The first transmission submodule 828 may be configured to, when multiple uplink feedback transmissions corresponding to different time units are required to performed at the same moment, select uplink feedback corresponding to one of the time units for transmission, and abandon transmission of the uplink feedback corresponding to the remaining time units.

The second transmission submodule 829 may be configured to, when multiple uplink feedback transmissions corresponding to different time units are required to performed at the same moment, multiplex multiple uplink feedbacks corresponding to different time units for transmission.

For example, the base station may configure a plurality of uplink feedback transmission priorities for different time units through RRC signaling, and the UE may select a time unit with a higher priority, or select a time unit with a shorter length according to the lengths of the time units corresponding to the plurality of uplink feedback, and then transmit the uplink feedback corresponding to the selected time unit. For another example, the base station may select one of the time units, and multiplex uplink feedbacks corresponding to different time units within the selected time unit for transmission.

In the above example, when it is required to perform multiple uplink feedback transmissions corresponding to different time units at the same moment, multiple uplink feedback corresponding to multiple different time units may be transmitted in multiple manners, and the implementation means are flexibly varied.

Figure 13:
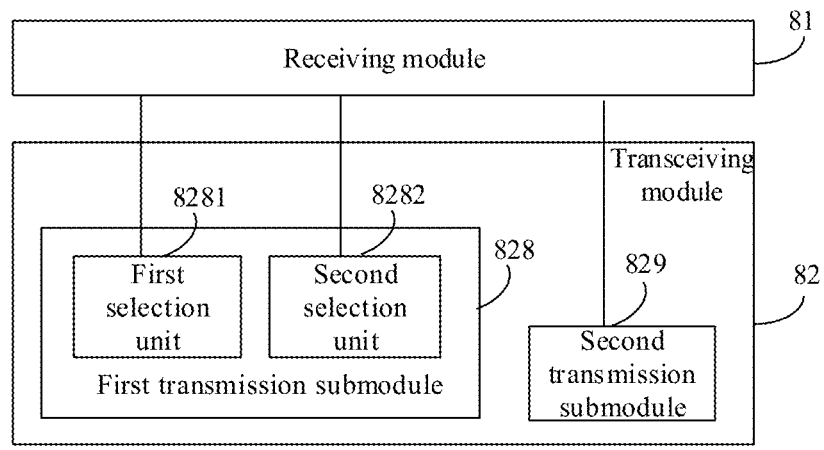
FIG. 13 is a block diagram illustrating another information transceiving apparatus according to an example of the present disclosure.

FIG. 13 is a block diagram illustrating another information transceiving apparatus according to an example of the present disclosure. As shown in FIG. 13, based on the example in FIG. 12, the first transmission submodule 828 may include a first selection unit 8281 or a second selection unit 8282.

The first selection unit 8281 may be configured to, obtain priorities of multiple uplink feedbacks from received RRC signaling, and select the uplink feedback corresponding to one of the time units according to the priorities.

The second selection unit 8282 may be configured to, select the uplink feedback corresponding to one of the time units according to lengths of the time units corresponding to multiple uplink feedbacks.

In the above examples, the uplink feedback corresponding to one time unit may be selected according to the obtained priorities of multiple uplink feedbacks, or the uplink feedback corresponding to one time unit may be selected according to the lengths of the time units corresponding to multiple uplink feedbacks, and the implementing means are flexibly varied.

Figure 14:
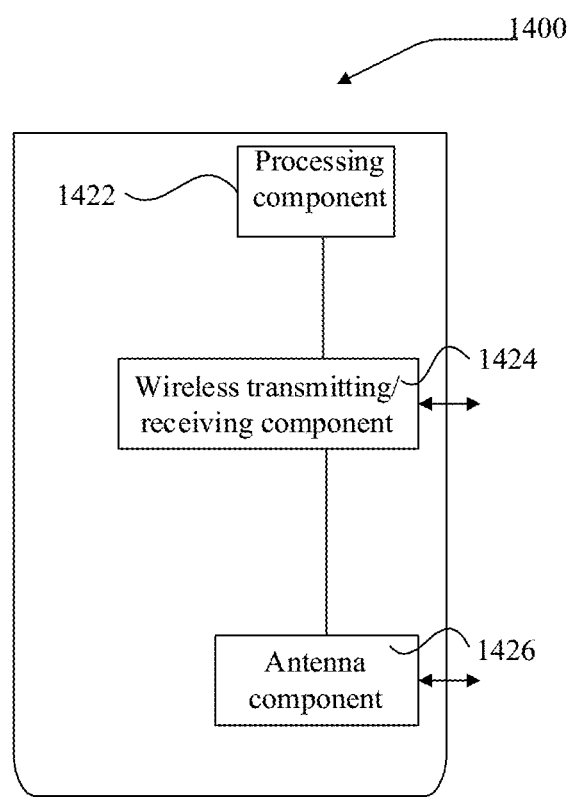
FIG. 14 shows a block diagram applicable to an information scheduling apparatus according to an example of the present disclosure.

FIG. 14 shows a block diagram applicable to an information scheduling apparatus according to an example of the present disclosure. The apparatus 1400 may be provided as a base station. Referring to FIG. 14, the apparatus 1400 may include a processing component 1422, a wireless transmitting/receiving component 1424, an antenna component 1426, and a signal processing portion specific to a wireless interface. The processing component 1422 may further include one or more processors.

One processor of the processing component 1422 may be configured to:

configure time unit information for user equipment (UE), wherein the time unit information indicates one or more time units;

schedule at least one of user data or uplink feedback of downlink data according to the configured time unit information.

In an example, there is also provided a non-transitory computer readable storage medium including instructions, where the instructions are executable by the processing component 1422 of the apparatus 1400 to perform the information scheduling method as described above. For example, the non-transitory computer readable storage medium may be a ROM, a random access memory (RAM), a CD-ROM, a magnetic tape, a floppy disk, and an optical data storage device.

Figure 15:
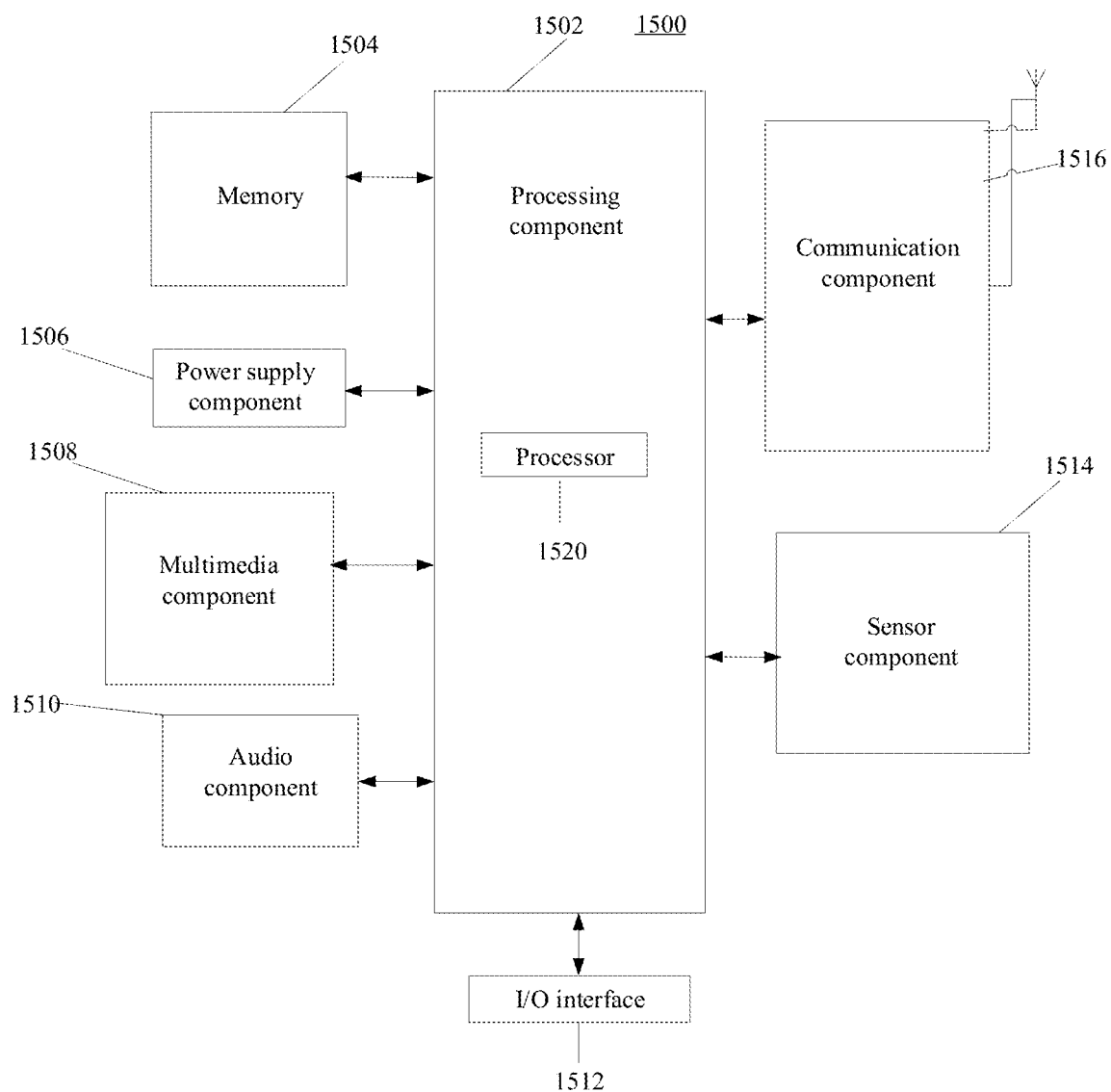
FIG. 15 shows a block diagram applicable to an information transceiving apparatus according to an example of the present disclosure.

FIG. 15 shows a block diagram applicable to an information transceiving apparatus according to an example of the present disclosure. For example, the apparatus 1500 may be a mobile phone, a computer, a digital broadcasting terminal, a messaging device, a game console, a tablet device, medical equipment, fitness equipment, personal digital assistants and other user equipment.

Refer to FIG. 15, the apparatus 1500 may include one or more of the following components: a processing component 1502, a memory 1504, a power supply component 1506, a multimedia component 1508, an audio component 1510, an input/output (I/O) interface 1512, a sensor component 1514, and the communication component 1516.

The processing component 1502 generally controls the overall operations of the apparatus 1500, such as operations associated with display, telephone calls, data communications, camera operations, and recording operations. The processing component 1502 may include one or more processors 1520 to execute instructions to complete all or part of the steps of the foregoing method. In addition, the processing component 1502 may include one or more modules to facilitate the interaction between the processing component 1502 and other components. For example, the processing component 1502 may include a multimedia module to facilitate the interaction between the multimedia component 1508 and the processing component 1502.

One processor 1520 of the processing component 1502 may be configured to:

receive time unit information configured by a base station for the UE, where the time unit information indicates one or more time units;

perform at least one of data transmission, data reception, or uplink feedback transmission of downlink data according to the time unit information.

The memory 1504 is configured to store various types of data to support operation at the apparatus 1500. Examples of these data include instructions for any application or method operating at the apparatus 1500, contact data, phone book data, messages, pictures, videos, and the like. The memory 1504 may be implemented by any type of volatile or non-volatile storage device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disk.

The power component 1506 provides power to various components of the apparatus 1500. The power component 1506 may include a power management system, one or more power sources, and other components associated with power generated, managed, and distributed for the apparatus 1500.

The multimedia component 1508 includes a screen that provides an output interface between the apparatus 1500 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 1508 includes a front camera and/or a rear camera. When the apparatus 1500 is in an operation mode, such as a shooting mode or a video mode, the front camera and/or the rear camera may receive external multimedia data. Each of the front and rear cameras may be a fixed optical lens system or have a focal length and an optical zoom capability.

The audio component 1510 is configured to output and/or input audio signals. For example, the audio component 1510 includes a microphone (MIC) configured to receive an external audio signal when the apparatus 1500 is in an operation mode, such as a call mode, a recording mode, and a voice recognition mode. The received audio signal may be further stored in the memory 1504 or transmitted via the communication component 1516. In some examples, the audio component 1510 also includes a loudspeaker for outputting an audio signal.

The I/O interface 1512 provides an interface between the processing component 1502 and a peripheral interface module which may be a keyboard, a click wheel, a button, or the like. These buttons may include, but are not limited to a home button, a volume button, a start button, and a lock button.

The sensor component 1514 includes one or more sensors for providing a status assessment in various aspects to the apparatus 1500. For example, the sensor component 1514 may detect an open/closed state of the apparatus 1500, and the relative positioning of components, for example, the component is a display and a keypad of the apparatus 1500. The sensor component 1514 may also detect a change in position of the apparatus 1500 or a component of the apparatus 1500, the presence or absence of a user in contact with the apparatus 1500, the orientation or acceleration/deceleration of the apparatus 1500 and a change in temperature of the apparatus 1500. The sensor component 1514 may include a proximity sensor configured to detect the presence of nearby objects without any physical contact. The sensor component 1514 may also include a light sensor, such as a CMOS or CCD image sensor, for use in imaging applications. In some examples, the sensor component 1514 may also include an acceleration sensor, a gyro sensor, a magnetic sensor, a pressure sensor, or a temperature sensor.

The communication component 1516 is configured to facilitate wired or wireless communication between the apparatus 1500 and other devices. The apparatus 1500 may access a wireless network based on a communication standard, such as WiFi, 2G or 3G, or a combination thereof. In an example, the communication component 1516 receives broadcast signals or broadcast associated information from an external broadcast management system via a broadcast channel. In an example, the communication component 1516 also includes a near field communication (NFC) module to facilitate short range communication. For example, the NFC module may be implemented based on a radio frequency identification (RFID) technology, an infrared data association (IrDA) technology, an ultra wide band (UWB) technology, a Bluetooth (BT) technology, and other technologies.

In an example, the apparatus 1500 may be implemented by one or more application specific integrated circuits (ASICs), digital signal processors (DSPs), digital signal processing devices (DSPDs), programmable logic devices (PLDs), a field programmable gate array (FPGA), a controller, a microcontroller, a microprocessor or other electronic elements for performing the above methods.

In an example, there is also provided a non-transitory computer readable storage medium including instructions, such as a memory 1504 including instructions, where the instructions are executable by the processor 1520 of the apparatus 1500 to perform the method as described above. For example, the non-transitory computer readable storage medium may be a ROM, a random access memory (RAM), a CD-ROM, a magnetic tape, a floppy disk, and an optical data storage device.

For the apparatus examples, since they basically correspond to the method examples, reference may be made to the partial description of the method examples. The apparatus examples described above are merely illustrative, wherein the units described as separate components may or may not be physically separated, and the components displayed as units may or may not be physical units, i.e., may be located in one place or may be distributed to multiple network units. Some or all of the modules may be selected according to actual needs to achieve the objectives of the present disclosure. Those of ordinary skill in the art can understand and implement the present disclosure without any creative effort.

According to a first aspect of the present disclosure, an information scheduling method, applied to a base station, comprising:

configuring time unit information for user equipment (UE), wherein the time unit information indicates one or more time units;

scheduling at least one of user data or uplink feedback of downlink data according to the configured time unit information.

In an example, configuring the time unit information for the UE comprises:

transmitting the time unit information to the UE through at least one of radio resource control (RRC) signaling or downlink control information (DCI).

In an example, scheduling the user data according to the configured time unit information comprises:

indicating, in DCI for scheduling user data transmission, a first number of time units between the time unit at which the user data transmission starts and the time unit at which the DCI transmission is located.

In an example, scheduling the uplink feedback according to the configured time unit information comprises one or more of:

when the UE does not repeat transmission of the uplink feedback, a transmission start time and transmission end time of the uplink feedback are both within the same time unit;

when the UE repeats the transmission of the uplink feedback, the transmission start time and transmission end time of each repeated transmission are both within a same time unit, and the transmission start times and transmission end times of different repeated transmissions are within different time units respectively;

when the UE repeats the transmission of the uplink feedback, an interval period between repeated transmissions is an integer multiple of the time unit;

indicating, in DCI for scheduling downlink data transmission, a second number of time units between the time unit at which the downlink data transmission is ended and the time unit at which a corresponding uplink feedback transmission is located;

when multiple uplink feedback transmissions corresponding to multiple downlink data transmissions are within the same time unit, combining multiple uplink feedbacks together for transmission.

In an example, configuring the time unit information for the UE comprises:

when a plurality of time units are configured for the UE, transmitting, through downlink control information (DCI), one of the plurality of time units as a time unit used for at least one of current user data transmission or uplink feedback of the downlink data; or transmitting indication information to the UE through DCI, wherein the indication information is configured to indicate a time unit currently for the UE; or transmitting a physical layer parameter used for the user data transmission to the UE through the DCI for scheduling the user data transmission, wherein the physical layer parameter is configured to implicitly indicate the time unit used for at least one of the current user data transmission or uplink feedback of the downlink data; or transmitting a value of a preset information domain to the UE through the DCI, wherein the value of the preset information domain or a format of the DCI is configured to implicitly indicate the time unit currently for the UE.

In an example, the time unit information further comprises at least one of mode information and an offset corresponding to the time unit.

According to a second aspect of the present disclosure, an information transceiving method, applied to user equipment (UE), comprising:

receiving time unit information configured by a base station for the UE, wherein the time unit information indicates one or more time units;

performing at least one of data transmission, data reception, or uplink feedback transmission of downlink data according to the time unit information.

In an example, receiving the time unit information configured by the base station for the UE comprises:

receiving the time unit information transmitted by the base station through at least one of radio resource control (RRC) signaling or downlink control information (DCI).

In an example, performing at least one of data transmission or data reception according to the time unit information, comprises:

obtaining, from downlink control information (DCI) for scheduling user data transmission, a first number of time units between the time unit at which the user data transmission starts and the time unit at which the DCI transmission is located;

determining the time unit at which the user data transmission starts according to the first number; and performing at least one of the data transmission or data reception according to the time unit at which the user data transmission starts.

In an example, performing the uplink feedback transmission of downlink data according to the time unit information, comprises one or more of:

when transmission of the uplink feedback is not repeated, performing the uplink feedback within one time unit;

when transmission of the uplink feedback is repeated, performing every repeated transmission within one time unit, and performing different repeated transmissions within different time units, wherein an interval period between repeated transmissions is an integer multiple of the time unit;

obtaining, from DCI for scheduling downlink data transmission, a second number of time units between the time unit at which the downlink data transmission is ended and the time unit at which a corresponding uplink feedback transmission is located, determining the time unit at which the corresponding uplink feedback transmission is located according to the second number, and performing the uplink feedback according to the time unit at which the corresponding uplink feedback transmission is located; and when multiple uplink feedback transmissions corresponding to multiple downlink data transmissions are within a same time unit, combining multiple uplink feedbacks together for transmission.

In an example, receiving the time unit information configured by the base station for the UE, comprises:

receiving downlink control information (DCI) transmitted by the base station, obtaining a time unit from the DCI, and using the obtained time unit as a time unit used for at least one of current user data transmission or uplink feedback; or receiving the DCI transmitted by the base station, obtaining indication information from the DCI, and obtaining a time unit currently for the UE according to the indication information; or receiving from the base station the DCI for scheduling user data transmission, obtaining a physical layer parameter used for the user data transmission from the DCI, and obtaining the time unit used for at least one of the current user data transmission or uplink feedback according to the physical layer parameter; or receiving the DCI transmitted by the base station, obtaining a value of a preset information domain from the DCI, and obtaining the time unit currently for the UE according to the value of the preset information domain or a format of the DCI.

In an example, the time unit information further comprises at least one of mode information and an offset corresponding to the time unit.

In an example, performing the uplink feedback transmission according to the time unit information comprises:

when multiple uplink feedback transmissions corresponding to different time units are required to performed at the same moment, selecting uplink feedback corresponding to one of the time units for transmission, and abandoning transmission of the uplink feedback corresponding to the remaining time units; or when multiple uplink feedback transmissions corresponding to different time units are required to performed at the same moment, multiplexing multiple uplink feedbacks corresponding to different time units for transmission.

In an example, selecting the uplink feedback corresponding to one of the time units for transmission comprises:

obtaining priorities of multiple uplink feedbacks from received RRC signaling, and selecting the uplink feedback corresponding to one of the time units according to the priorities; or selecting the uplink feedback corresponding to one of the time units according to lengths of the time units corresponding to multiple uplink feedbacks.

According to a third aspect of the present disclosure, an information scheduling apparatus, applied to a base station, comprising:

a configuration module configured to, configure time unit information for user equipment (UE), wherein the time unit information indicates one or more time units;

a scheduling module configured to, schedule at least one of user data or uplink feedback of downlink data according to the time unit information configured by the configuration module.

In an example, the configuration module is configured to:

transmit the time unit information to the UE through at least one of radio resource control (RRC) signaling or downlink control information (DCI).

In an example, the scheduling module is configured to:

indicate, in DCI for scheduling user data transmission, a first number of time units between the time unit at which the user data transmission starts and the time unit at which the DCI transmission is located.

In an example, the scheduling module comprises at least one of:

a first scheduling submodule configured to, when the UE does not repeat transmission of the uplink feedback, set both a transmission start time and transmission end time of the uplink feedback to be within the same time unit;

a second scheduling submodule configured to, when the UE repeats the transmission of the uplink feedback, set both the transmission start time and transmission end time of each repeated transmission to be within the same time unit, and set the transmission start times and transmission end times of different repeated transmissions to be within different time units respectively;

a third scheduling submodule configured to, when the UE repeats the transmission of the uplink feedback, set an interval period between repeated transmissions to be an integer multiple of the time unit;

a fourth scheduling submodule configured to, indicate, in DCI for scheduling downlink data transmission, a second number of time units between the time unit at which the downlink data transmission is ended and the time unit at which a corresponding uplink feedback transmission is located;

a fifth scheduling submodule configured to, when multiple uplink feedback transmissions corresponding to multiple downlink data transmissions are within the same time unit, combine multiple uplink feedbacks together for transmission.

In an example, the configuration module comprises:

a first configuration submodule configured to, when a plurality of time units are configured for the UE, transmitting, through downlink control information (DCI), one of the plurality of time units as a time unit used for at least one of current user data transmission or uplink feedback of the downlink data; or a second configuration submodule configured to, transmit indication information to the UE through DCI, wherein the indication information is configured to indicate a time unit currently for the UE; or a third configuration submodule configured to, transmit a physical layer parameter used for the user data transmission to the UE through the DCI for scheduling the user data transmission, wherein the physical layer parameter is configured to implicitly indicate the time unit used for at least one of the current user data transmission or uplink feedback of the downlink data; or a fourth configuration submodule configured to, transmit a value of a preset information domain to the UE through the DCI, wherein the value of the preset information domain or a format of the DCI is configured to implicitly indicate the time unit currently for the UE.

In an example, the time unit information further comprises at least one of mode information and an offset corresponding to the time unit.

According to a fourth aspect of the present disclosure, an information transceiving apparatus, applied to user equipment (UE), comprising:
a receiving module configured to, receive time unit information configured by a base station for the UE, wherein the time unit information indicates one or more time units;
a transceiving module configured to, perform at least one of data transmission, data reception, or uplink feedback transmission of downlink data according to the time unit information received by the receiving module.

In an example, the receiving module is configured to:
receive the time unit information transmitted by the base station through at least one of radio resource control (RRC) signaling or downlink control information (DCI).

In an example, the transceiving module comprises:
an obtaining submodule configured to, obtain, from downlink control information (DCI) for scheduling user data transmission, a first number of time units between the time unit at which the user data transmission starts and the time unit at which DCI transmission is located;
a determination submodule configured to, determine the time unit at which the user data transmission starts according to the first number obtained by the obtaining submodule; and
a transceiving submodule configured to, perform at least one of the data transmission or data reception according to the time unit at which the user data transmission starts determined by the determination submodule.

In an example, the transceiving module comprises at least one of:
a first feedback submodule configured to, when transmission of the uplink feedback is not repeated, perform the uplink feedback within one time unit;
a second feedback submodule configured to, when transmission of the uplink feedback is repeated, perform every repeated transmission within one time unit, and perform different repeated transmissions within different time units, wherein an interval period between repeated transmissions is an integer multiple of the time unit;
a third feedback submodule configured to, obtain, from DCI for scheduling downlink data transmission, a second number of time units between the time unit at which the downlink data transmission is ended and the time unit at which a corresponding uplink feedback transmission is located, determine the time unit at which the corresponding uplink feedback transmission is located according to the second number, and perform the uplink feedback according to the time unit at which the corresponding uplink feedback transmission is located; and
a fourth feedback submodule configured to, when multiple uplink feedback transmissions corresponding to multiple downlink data transmissions are within a same time unit, combine multiple uplink feedbacks together for transmission.

In an example, the receiving module comprises:
a first receiving and obtaining submodule configured to, receive downlink control information (DCI) transmitted by the base station, obtain a time unit from the DCI, and use the obtained time unit as a time unit used for at least one of current user data transmission or uplink feedback; or
a second receiving and obtaining submodule configured to, receive the DCI transmitted by the base station, obtain indication information from the DCI, and obtain a time unit currently for the UE according to the indication information; or
a third receiving and obtaining submodule configured to, receive from the base station the DCI for scheduling user data transmission, obtain a physical layer parameter used for the user data transmission from the DCI, and obtain the time unit used for at least one of the current user data transmission or uplink feedback according to the physical layer parameter; or
a fourth receiving and obtaining submodule configured to, receive the DCI transmitted by the base station, obtain a value of a preset information domain from the DCI, and obtain the time unit currently for the UE according to the value of the preset information domain or a format of the DCI.

In an example, the time unit information further comprises at least one of mode information and an offset corresponding to the time unit.

In an example, the transceiving module comprises:
a first transmission submodule configured to, when multiple uplink feedback transmissions corresponding to different time units are required to performed at the same moment, select uplink feedback corresponding to one of the time units for transmission, and abandon transmission of the uplink feedback corresponding to the remaining time units; or
a second transmission submodule configured to, when multiple uplink feedback transmissions corresponding to different time units are required to performed at the same moment, multiplex multiple uplink feedbacks corresponding to different time units for transmission.

In an example, the first transmission submodule comprises:
a first selection unit configured to, obtain priorities of multiple uplink feedbacks from received RRC signaling, and select the uplink feedback corresponding to one of the time units according to the priorities; or
a second selection unit configured to, select the uplink feedback corresponding to one of the time units according to lengths of the time units corresponding to multiple uplink feedbacks.

According to a fifth aspect of the present disclosure, a base station, comprising:
a processor; and
a storage storing instructions executable by the processor;
wherein the processor is configured to:

configure time unit information for user equipment (UE), wherein the time unit information indicates one or more time units;

schedule at least one of user data or uplink feedback of downlink data according to the configured time unit information.

According to a sixth aspect of the present disclosure, user equipment, comprising:

a processor; and a storage storing instructions executable by the processor; wherein the processor is configured to:

receive time unit information configured by a base station for the UE, wherein the time unit information indicates one or more time units;

perform at least one of data transmission, data reception, or uplink feedback transmission of downlink data according to the time unit information.

According to a seventh aspect of the present disclosure, a computer-readable storage medium storing computer instructions, wherein the instructions are executed by a processor to implement the steps of the above information scheduling method.

According to an eighth aspect of the present disclosure, a computer-readable storage medium storing computer instructions, wherein the instructions are executed by a processor to implement the steps of the above information transceiving method.

The technical solutions provided by the examples of the present disclosure may include the following beneficial effects:

By configuring time unit information for the UE, flexible configurable time unit may be supported in the NR system, and at least one of user data and uplink feedback of downlink data may be scheduled according to the configured time unit information, so as to save the bit overhead of control signaling.

By receiving time unit information configured by the base station for the UE, and performing at least one of data transmission, data reception and uplink feedback transmission of downlink data according to the time unit information, the delay and reliability requirements of different services can be better satisfied.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

Other examples of the present disclosure will be readily apparent to those skilled in the art after considering the specification and practicing the contents disclosed herein. The present application is intended to cover any variations, uses, or adaptations of the present disclosure, which follow the general principle of the present disclosure and include common knowledge or conventional technical means in the art that are not disclosed in the present disclosure. The specification and examples are to be regarded as illustrative only. The true scope and spirit of the present disclosure are pointed out by the following claims.

It is to be understood that the present disclosure is not limited to the precise structures that have described and shown in the drawings, and various modifications and changes can be made without departing from the scope thereof. The scope of the disclosure is to be limited only by the appended claims.

What is claimed is:

1. An information scheduling method, comprising: configuring time unit information for user equipment (UE) by a base station, wherein the time unit information indicates one or more time units; and scheduling, by the base station, at least one of user data or uplink feedback of downlink data according to the configured time unit information; wherein scheduling the uplink feedback according to the configured time unit information comprises: in response to that the UE repeats the transmission of the uplink feedback, a transmission start time and a transmission end time of each repeated transmission are both within a same time unit, and transmission start times and transmission end times of different repeated transmissions are within different time units; indicating, in DCI for scheduling downlink data transmission, a second number of time units between a third time unit at which the downlink data transmission ends and a fourth time unit at which a corresponding uplink feedback transmission is located.

2. The method according to claim 1, wherein configuring the time unit information for the UE comprises:

transmitting the time unit information to the UE through at least one of radio resource control (RRC) signaling or downlink control information (DCI).

3. The method according to claim 1, wherein scheduling the user data according to the configured time unit information comprises:

indicating, in downlink control information (DCI) for scheduling user data transmission, a first number of time units between a first time unit at which the user data transmission starts and a second time unit at which the DCI transmission is located.

4. The method according to claim 1, wherein configuring the time unit information for the UE comprises:

when a plurality of time units are configured for the UE, transmitting, through downlink control information (DCI), one of the plurality of time units as a time unit used for at least one of current user data transmission or uplink feedback of the downlink data; or transmitting indication information to the UE through DCI, wherein the indication information is configured to indicate a time unit currently for the UE; or transmitting a physical layer parameter used for the user data transmission to the UE through the DCI for scheduling the user data transmission, wherein the physical layer parameter is configured to indicate the time unit used for at least one of the current user data transmission or uplink feedback of the downlink data; or transmitting a value of a preset information domain to the UE through the DCI, wherein the value of the preset information domain or a format of the DCI is configured to indicate the time unit currently for the UE.

5. The method according to claim 1, wherein the time unit information further comprises at least one of mode information or an offset corresponding to a time unit.

6. A base station, comprising:

a processor; and a storage storing instructions executable by the processor;

wherein the processor is configured to implement the method according to claim 1.

7. The method according to claim 1, wherein scheduling the uplink feedback according to the configured time unit information comprises: in response to that the UE does not repeat transmission of the uplink feedback, a transmission start time and a transmission end time of the uplink feedback are both within a same time unit; in response to that the UE repeats the transmission of the uplink feedback, an interval period between repeated transmissions is an integer multiple of the time unit; and in response to that multiple uplink feedback transmissions corresponding to multiple downlink data transmissions are within the same time unit, combining multiple uplink feedbacks together for transmission.

8. An information transceiving method, comprising: receiving time unit information configured by a base station for a User Equipment(UE), wherein the time unit information indicates one or more time units; and performing at least one of data transmission, data reception, or uplink feedback transmission of downlink data according to the time unit information; in response to that transmission of the uplink feedback is repeated, performing the uplink feedback transmission of downlink data according to the time unit information comprises: in response to that transmission of the uplink feedback is repeated, performing every repeated transmission within one time unit, and performing different repeated transmissions within different time units, wherein an interval period between repeated transmissions is an integer multiple of the time unit; obtaining, from DCI for scheduling downlink data transmission, a second number of time units between a third time unit at which the downlink data transmission ends and a fourth time unit at which a corresponding uplink feedback transmission is located, determining the fourth time unit at which the corresponding uplink feedback transmission is located according to the second number, and performing the uplink feedback according to the fourth time unit at which the corresponding uplink feedback transmission is located.

9. The method according to claim 8, wherein receiving the time unit information configured by the base station for the UE comprises:
receiving the time unit information transmitted by the base station through at least one of radio resource control (RRC) signaling or downlink control information (DCI).

10. The method according to claim 8, wherein performing at least one of data transmission or data reception according to the time unit information, comprises:
obtaining, from downlink control information (DCI) for scheduling user data transmission, a first number of time units between a first time unit at which the user data transmission starts and a second time unit at which the DCI transmission is located;
determining the first time unit at which the user data transmission starts according to the first number; and
performing at least one of the data transmission or data reception according to the first time unit at which the user data transmission starts.

11. The method according to claim 8, wherein receiving the time unit information configured by the base station for the UE, comprises:
receiving downlink control information (DCI) transmitted by the base station, obtaining a time unit from the DCI, and using the obtained time unit as a time unit used for at least one of current user data transmission or uplink feedback; or receiving the DCI transmitted by the base station, obtaining indication information from the DCI, and obtaining a time unit currently for the UE according to the indication information; or
receiving from the base station the DCI for scheduling user data transmission, obtaining a physical layer parameter used for the user data transmission from the DCI, and obtaining the time unit used for at least one of the current user data transmission or uplink feedback according to the physical layer parameter; or
receiving the DCI transmitted by the base station, obtaining a value of a preset information domain from the DCI, and obtaining the time unit currently for the UE according to the value of the preset information domain or a format of the DCI.

12. The method according to claim 8, wherein the time unit information further comprises at least one of mode information or an offset corresponding to a time unit.

13. The method according to claim 8, wherein performing the uplink feedback transmission according to the time unit information comprises:
in response to that multiple uplink feedback transmissions corresponding to different time units are required to performed at a same moment, selecting uplink feedback corresponding to one of the time units for transmission, and abandoning transmissions of the uplink feedback corresponding to remaining time units; or
in response to that multiple uplink feedback transmissions corresponding to different time units are required to performed at a same moment, multiplexing multiple uplink feedbacks corresponding to different time units for transmission.

14. The method according to claim 13, wherein selecting the uplink feedback corresponding to one of the time units for transmission comprises:
obtaining priorities of multiple uplink feedbacks from received RRC signaling, and selecting the uplink feedback corresponding to one of the time units according to the priorities; or
selecting the uplink feedback corresponding to one of the time units according to lengths of the time units corresponding to multiple uplink feedbacks.

15. The method according to claim 8, wherein performing the uplink feedback transmission of downlink data according to the time unit information, comprises one or more of:
in response to that transmission of uplink feedback is not repeated, performing the uplink feedback within one time unit; and in response to that multiple uplink feedback transmissions corresponding to multiple downlink data transmissions are within a same time unit, combining multiple uplink feedbacks together for transmission.

16. User equipment, comprising: one or more processors; and a non-transitory storage storing instructions executable by the one or more processors, wherein the one or more processors are configured to: receive time unit information configured by a base station for the UE, wherein the time unit information indicates one or more time units; and perform at least one of data transmission, data reception, or uplink feedback transmission of downlink data according to the time unit information; wherein when performing the uplink feedback transmission of downlink data according to the time unit information, the one or more processors are configured to perform of: in response to that transmission of the uplink feedback is repeated, perform every repeated transmission within one time unit, and performing different repeated transmissions within different time units; an interval period between repeated transmissions is an integer multiple of the time unit; obtain, from DCI for scheduling downlink data transmission, a second number of time units between a third time unit at which the downlink data transmission ends and a fourth time unit at which a corresponding uplink feedback transmission is located, determining the fourth time unit at which the corresponding uplink feedback transmission is located according to the second number, and performing the uplink feedback according to the fourth time unit at which the corresponding uplink feedback transmission is located.

17. The user equipment according to claim 16, wherein when receiving the time unit information configured by the base station for the UE, the one or more processors are configured to:
  receive the time unit information transmitted by the base station through at least one of radio resource control (RRC) signaling or downlink control information (DCI).

18. The user equipment according to claim 16, wherein when performing at least one of data transmission or data reception according to the time unit information, the one or more processors are configured to:
  obtain, from downlink control information (DCI) for scheduling user data transmission, a first number of time units between a first time unit at which the user data transmission starts and a second time unit at which the DCI transmission is located;
  determine the first time unit at which the user data transmission starts according to the first number; and
  perform at least one of the data transmission or data reception according to the first time unit at which the user data transmission starts.

19. The user equipment according to claim 16, wherein when receiving the time unit information configured by the base station for the UE, the one or more processors are configured to:
  receive downlink control information (DCI) transmitted by the base station, obtain a time unit from the DCI, and use the obtained time unit as a time unit used for at least one of current user data transmission or uplink feedback; or
  receive the DCI transmitted by the base station, obtain indication information from the DCI, and obtain a time unit currently for the UE according to the indication information; or
  receive from the base station the DCI for scheduling user data transmission, obtain a physical layer parameter used for the user data transmission from the DCI, and obtain the time unit used for at least one of the current user data transmission or uplink feedback according to the physical layer parameter; or
  receive the DCI transmitted by the base station, obtain a value of a preset information domain from the DCI, and obtain the time unit currently for the UE according to the value of the preset information domain or a format of the DCI.

20. The user equipment according to claim 16, wherein when performing the uplink feedback transmission of downlink data according to the time unit information, the one or more processors are configured to perform one or more of:
  in response to that transmission of uplink feedback is not repeated, perform the uplink feedback within one time unit; and in response to that multiple uplink feedback transmissions corresponding to multiple downlink data transmissions are within a same time unit, combining multiple uplink feedbacks together for transmission.

\* \* \* \* \*